United States Patent [19]
Touzin et al.

[11] Patent Number: 6,101,885
[45] Date of Patent: Aug. 15, 2000

[54] SUBSTITUTION KITS FOR VOLUMETRIC FLOW SENSORS AND CORRESPONDING VORTEX FLOW SENSORS

[75] Inventors: Michel R. Touzin, Maulburg; Frank Ohle, Steinen, both of Germany

[73] Assignee: Endress + Hauser Flowtec AG, Reinach, Switzerland

[21] Appl. No.: 09/094,065

[22] Filed: Jun. 9, 1998

Related U.S. Application Data

[60] Provisional application No. 60/055,012, Aug. 7, 1997.

[30] Foreign Application Priority Data

Jun. 24, 1997 [EP] European Pat. Off. ............... 97110288

[51] Int. Cl.[7] ................................ G01F 1/32; G01F 1/42
[52] U.S. Cl. ...................... 73/861.22; 73/861.61
[58] Field of Search ............................ 73/861.22, 861.21, 73/861.24, 861.61, 861.52, 118.2

[56] References Cited

U.S. PATENT DOCUMENTS

| | | |
|---|---|---|
| 4,171,643 | 10/1979 | Frick . |
| 4,186,599 | 2/1980 | Frick . |
| 4,397,192 | 8/1983 | Mollet ................... 73/861.22 |
| 4,448,064 | 5/1984 | Asayama ................ 73/118.2 |
| 4,696,193 | 9/1987 | Nanba et al. ........... 73/861.22 |

FOREIGN PATENT DOCUMENTS

| | | |
|---|---|---|
| 2 050 611 | 1/1981 | United Kingdom . |
| 2 192 725 | 1/1988 | United Kingdom . |
| WO 83/03667 | 10/1983 | WIPO . |

*Primary Examiner*—Harshad Patel
*Attorney, Agent, or Firm*—Bose McKinney & Evans

[57] ABSTRACT

These substitution kits are provided for field-installed volumetric differential pressure flow sensors (101, 102, 103, 104, 105, 106) comprising bores (111, 121) for sensing the fluid pressure and an orifice plate (13) of standard thickness which is fixed fluid-tight between two pipes (1, 2) conducting a fluid to be measured. A first variant of the kit comprises an annular disk (23) which replaces the plate (13) and whose thickness is equal to that of the plate as well as whose opening has a diameter equal to the inside diameter of the pipes. A single bluff body (2311, 2312, 2313, 2314, 2317, 2318, 2319) is arranged in the lumen of the annular disk. The bore (111) of the pipe (1) is fluid-tightly closed by a device (18) after removal of the pressure sensor of the bore (111). A vortex sensing element (19) is inserted fluid-tightly in the bore (121) of the pipe (2) after removal of the sensor of this bore. Acc. to second variant both bores (111, 121) are closed fluid-tightly by devices (18, 28) after removal of the sensors of the bores, and a vortex sensing element (29; 39, 40) is fixed on or in wall of the pipe (2) adjacent the annular disk. Acc. to a third variant a vortex sensor (107, 108) comprises the annular disk (23) and the sensing element (29; 39, 40).

4 Claims, 8 Drawing Sheets

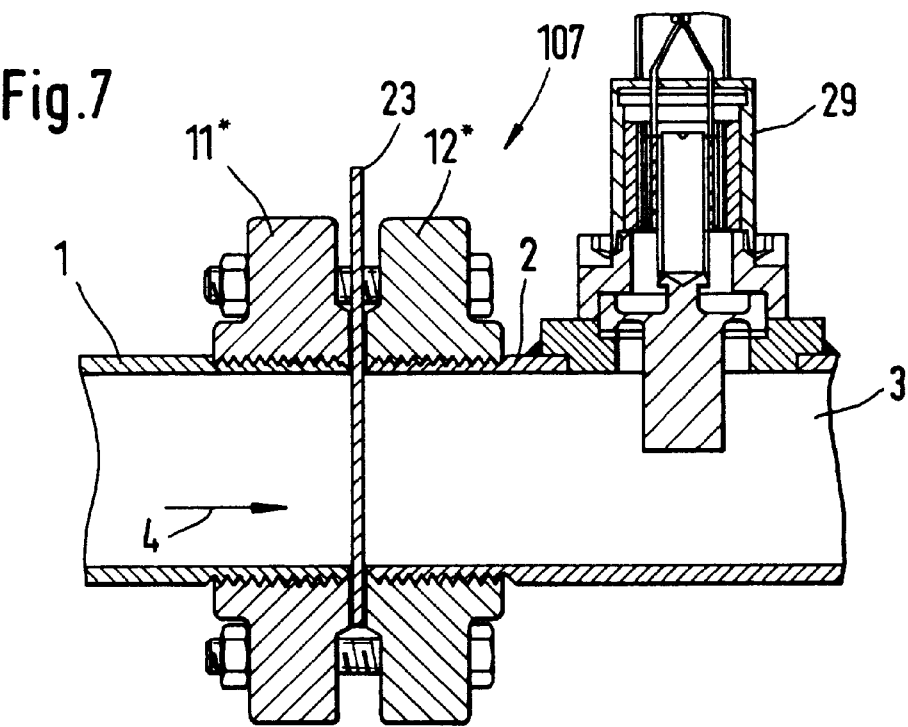
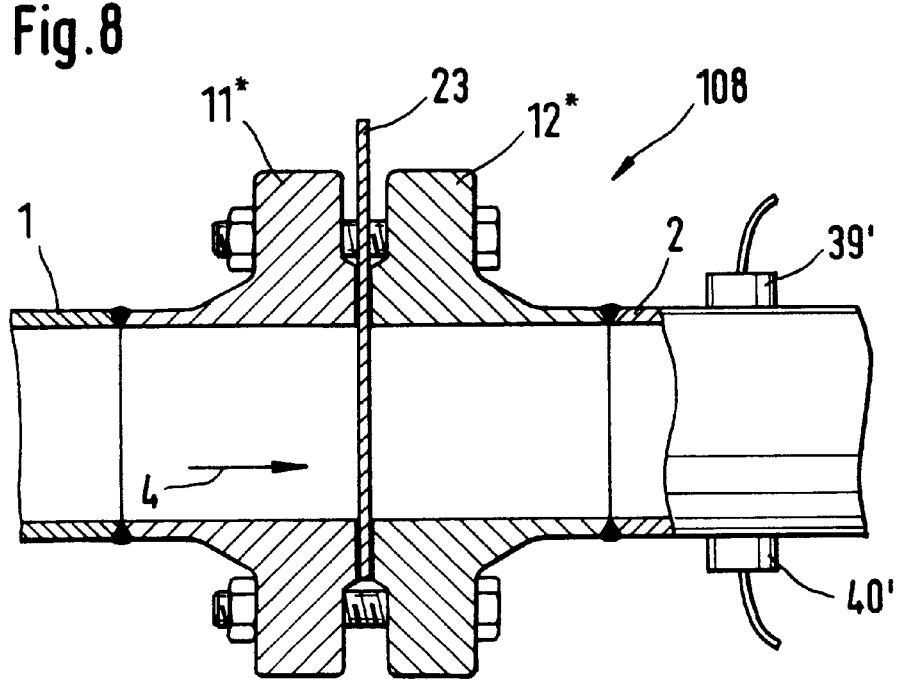

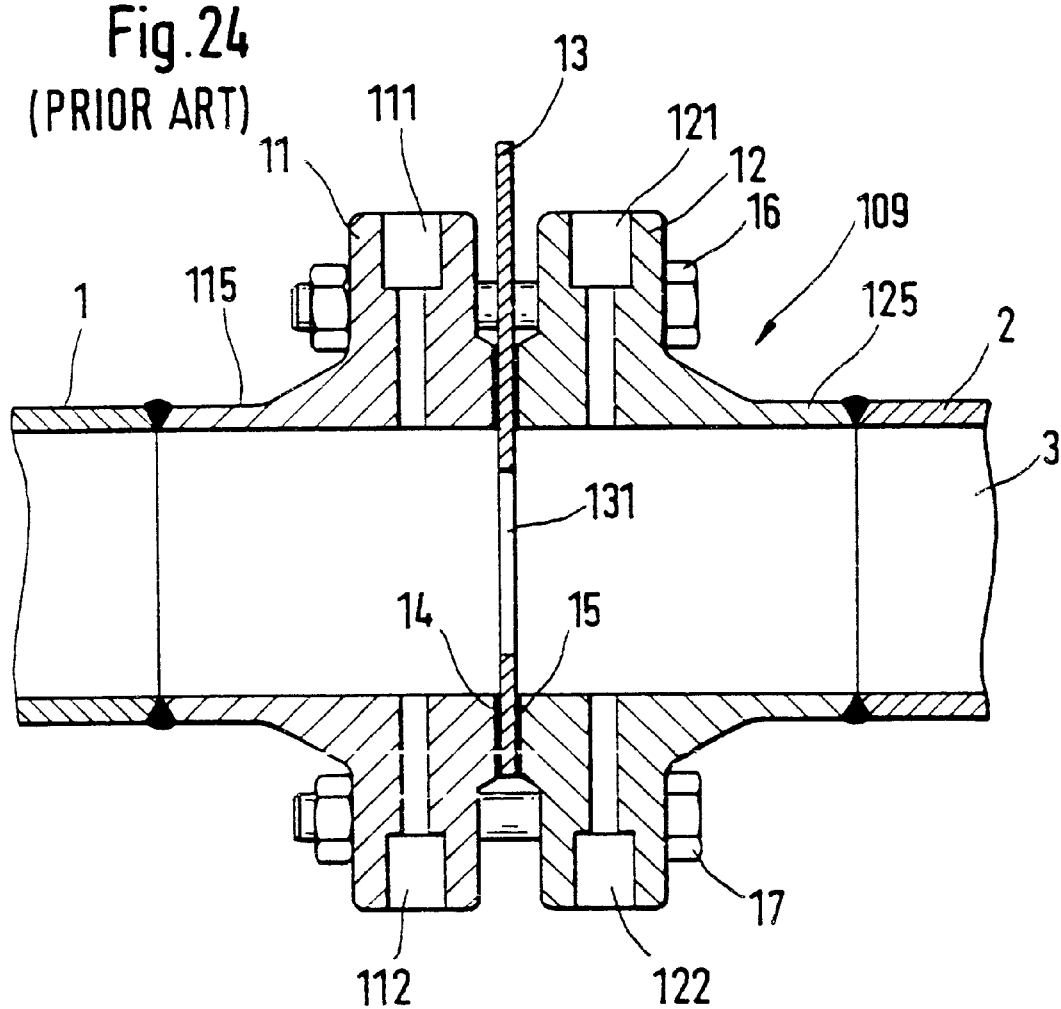

SUBSTITUTION KITS FOR VOLUMETRIC FLOW SENSORS AND CORRESPONDING VORTEX FLOW SENSORS

This application claims benefit of Provisional Appl. 60/055,012 filed Aug. 7, 1997.

FIELD OF THE INVENTION

This invention relates to substitution kits for field-installed volumetric flow sensors which are based on the measurement of the pressure differential across a restriction.

The invention further relates to vortex flow sensors which were implemented by the substitution using the kits or which are manufactured at a factory according to this substitution principle.

BACKGROUND OF THE INVENTION

Volumetric flow sensors which are based on the measurement of the differential pressure across a restriction are widely used in the measurement of fluid flow, cf. the journal "Chemical Engineering", May 1996, pages 94 to 102. They have an orifice plate which has a standard thickness and a bore of standard diameter, and which is fixed fluid-tight between a first pipe and a second pipe conducting a fluid to be measured. This is generally done by inserting the orifice plate between two flanges, one provided at the end of the first pipe and the other provided at the end of the second pipe facing said one flange. Further details are explained below in connection with FIG. 24.

The diameter of the orifice is smaller than the inside diameter of the pipes. A first pressure sensing element for sensing the fluid pressure upstream of the orifice plate is operatively connected with a bore formed in the first pipe close to the orifice plate. A second pressure sensing element for sensing the fluid pressure downstream of the orifice plate is operatively connected with a bore formed in the second pipe close to the orifice plate.

Frequently, the bore of the first pipe is provided in the flange associated with this pipe, and the bore of the second pipe is provided in the flange associated with this second pipe.

Compact versions in which the bores for sensing the pressure, the pressure sensors, and associated evaluation electronics with a housing are united are also in common use.

Since the orifice has a diameter smaller than the inside diameter of the two pipes, thus forming a restriction in the flow channel, according to Bernoulli's law, a pressure differential is produced across it by a moving fluid. From this pressure differential, volumetric flow rate can be determined, which is proportional to the square root of the quotient obtained by dividing the pressure difference by the density of the fluid.

SUMMARY OF THE INVENTION

The measurement accuracy attained with such standard orifice flow sensors is only about 2%. This accuracy can only be achieved if the same flow profile occurs at the measurement point at practically all times. This requires sufficiently long, straight pipe runs before and behind the measurement point in order to stabilize the flow profile. Furthermore, the measuring range is limited to about 1:3.

Also, the orifice plates are susceptible to contamination; since this changes their flow area, measuring errors occur. Furthermore, material may be removed from the inner edge of the orifice plate by solid particles being transported by the fluid, so that the flow area will gradually increase. Thus, the long-term stability of the measurement accuracy is also insufficient.

The narrowing of the flow channel by the orifice plate may also result in a flow pattern forming in the shading area directly behind it which leads, for example, to undesirable deposits of solids in the angular range formed by the orifice plate and the wall of the second pipe.

Finally, the narrowing of the flow channel by the orifice plate results in a considerable nonrecoverable pressure loss in the fluid.

To eliminate these disadvantages and improve the measurement accuracy while retaining as many field-installed components and modified components based on the differential pressure measurement principle as possible, a first variant of the invention provides a substitution kit for a field-installed volumetric flow sensor comprising:

an orifice plate of standard thickness
  which is fixed fluid-tight between a first pipe and a second pipe conducting a fluid to be measured, and
  which has an orifice with a diameter smaller than the inside diameter of the pipes;

a first pressure sensing element, operatively connected connected with a bore formed in the first pipe close to the orifice plate, for sensing the fluid pressure upstream of the orifice plate; and a second pressure sensing element, operatively connected with a second bore formed in the second pipe close to the orifice plate, for sensing the fluid pressure downstream of the orifice plate, said substitution kit comprising:
  an annular disk replacing the orifice plate
    whose thickness is equal to the thickness of the orifice plate,
    whose opening has a diameter equal to the inside diameter of the pipes, and
    whose opening contains a single bluff body
      which is not thicker than the annular disk in the direction of flow;
  a device for closing the bore in the first pipe fluid-tight after removal of the first pressure sensing element; and
  a vortex sensing element for fluid-tight installation in the bore in the second pipe after removal of the second pressure sensing element.

To eliminate the above disadvantages and improve the measurement accuracy while retaining as many field-installed components and modified components based on the differential measurement principle as possible, a second variant of the invention provides a substitution kit for a field-installed volumetric flow sensor comprising:

an orifice plate of standard thickness
  which is fixed fluid-tight between a first pipe and a second pipe conducting a fluid to be measured, and
  which has an orifice with a diameter smaller than the inside diameter of the pipes;

a first pressure sensing element, operatively connected connected with a bore formed in the first pipe close to the orifice plate, for sensing the fluid pressure upstream of the orifice plate; and a second pressure sensing element, operatively connected with a second bore formed in the second pipe close to the orifice plate, for sensing the fluid pressure downstream of the orifice plate, said substitution kit comprising:

an annular disk replacing the orifice plate
   whose thickness is equal to the thickness of the orifice plate,
   whose opening has a diameter equal to the inside diameter of the pipes, and
   whose opening contains a single bluff body
      which is not thicker than the annular disk in the direction of flow;
a device for closing the bore in the first pipe fluid-tight after removal of the first pressure sensing element;
a device for closing the bore in the second pipe fluid-tight after removal of the second pressure sensing element;
a vortex sensor
   which is mounted on or in the second pipe close to the annular disk.

According to a third variant, the invention consists in a vortex flow sensor comprising:
an annular disk of predetermined thickness
   which is to be fixed fluid-tight between a first pipe and a second pipe,
   whose opening has a diameter equal to the inside diameter of the pipes, and
   whose opening contains a single bluff body
      which is not thicker than the annular disk in the direction of flow; and
a vortex sensor
   which is mounted on or in the second pipe close to the annular disk.

In a first preferred embodiment of the second variant of the invention and in a first preferred embodiment of the third variant, the vortex sensor is installed fluid-tight in the wall of the second pipe and comprises a capacitive sensing element.

In a second preferred embodiment of the second variant of the invention and in a second preferred embodiment of the third variant, the vortex sensor comprises an ultrasonic measuring arrangement with two ultrasonic transducers mounted on the wall of the second pipe diametrically opposite each other.

The three variants of the invention are based on the common idea to replace the rather inaccurate and disadvantageous orifice differential pressure measurement principle in the field by the much more accurate and more long-term-stable vortex measurement principle, using as few new components as possible.

This is accomplished simply by replacing the orifice plate by the annular disk according to the invention with an associated single bluff body, and the two pressure sensing elements by the vortex sensing element according to the invention, with the unused bore or bores for the pressure sensing element or elements being closed fluid-tight. This represents a first advantage of the invention.

Another advantage is that in the invention, the measuring range is greater than 1:3, namely always greater than 1:10. Average values are, for example: 1:10 in the case of gas, 1:30 in the case of vapors, and 1:40 in the case of liquids.

A further advantage of the invention is that a vortex frequency is measured rather than values of a pressure difference, so that no zero adjustment is necessary.

Finally, cavitation, which is always undesirable, occurs at higher flow velocities than with standard orifice plates, so that higher flow velocities can be permitted. This is particularly important in the case of liquids with high vapor pressure, such as gasoline.

BRIEF DESCRIPTION OF THE DRAWINGS

The invention will now be explained in more detail with reference to the accompanying drawings, which show embodiments of the invention, mostly in longitudinal sections, and wherein like parts are designated by like reference characters, which, if already contained in one figure, have sometimes been omitted in subsequent figures to simplify the illustration. In the drawings:

FIG. 7 shows a first embodiment of a volumetric flow sensor according to the third variant of the invention;

FIG. 8 shows a second embodiment of a volumetric flow sensor according to the third variant of the invention;

FIG. 24 shows an example of a prior-art differential-pressure volumetric flow sensor.

DETAILED DESCRIPTION OF PREFERRED EMBODIMENTS

Figure 1:
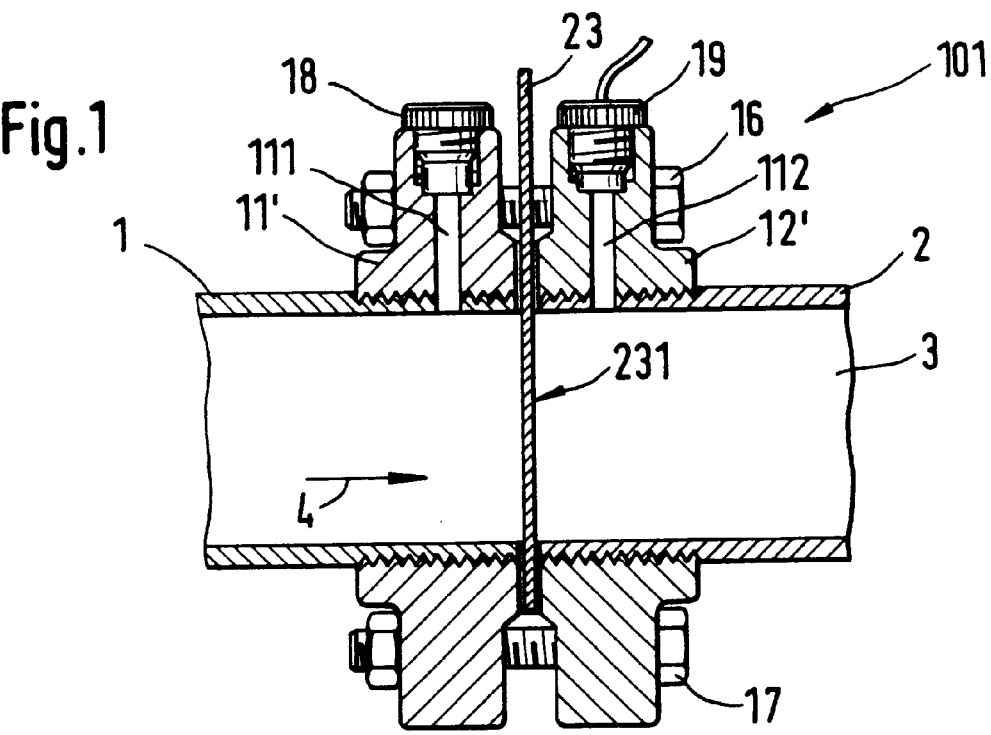
FIG. 1 shows a first embodiment of a volumetric flow sensor provided with the parts of a substitution kit according to the first variant of the invention.

Before explaining the invention, those parts of a conventional differential-pressure volumetric flow sensor which are important in connection with the invention will be described with the aid of the longitudinal section of FIG. 24.

At a measuring point, a flow sensor 109 is permanently installed between a first pipe 1 and a second pipe 2 which, in operation, conduct a fluid to be measured, such as a liquid, a gas, or a vapor.

In FIG. 24, the permanent installation was achieved by welding, as is illustrated by the welds shown. Other ways of fixing the flow sensor to pipes are also customary; some of them are explained below in connection with the embodiments.

Flow sensor 109 comprises a first flange 11, which is welded to the first pipe 1, and a second flange 12, welded to the second pipe 2. Flanges 11 and 12 are provided with short integral pipe sections 115 and 125, respectively, which are butt-welded to pipes 1 and 2, respectively.

The two flanges 11, 12 have the same inside diameter as the two pipes 1, 2. The two pipes 1, 2 and the two flanges 11, 12 thus form a flow channel 3 of constant inside diameter.

The two flanges 11, 12 are joined together fluid-tight by means of screws 16, 17, with ring seals 14, 15 and an orifice plate 13 inserted between the two flanges. Orifice plate 13 is thus fixed in position fluid-tight. It has a central bore 131 with a smaller diameter than the inside diameter of pipes 1, 2.

The first flange 11 contains two radial bores 111, 112 which are located on the same diameter and end in flow channel 3. Similarly, the second flange 12 contains radial bores 121, 122 which also end in flow channel 3.

The four radial bores 111, 112, 121, 122 in flanges 11, 12 are thus located close to bore 131 in orifice plate 13 and, hence, are suitable for sensing the pressure existing in the fluid upstream and downstream of orifice plate 13.

Operatively connected with at least one of radial bores 111, 112 and with at least one of radial bores 121, 122 are a first pressure sensing element and a second pressure sensing element, respectively. Since these connections can be made in various conventional ways, the two pressure sensing elements are not shown. The unused radial bores have to be closed fluid-tight, which is not illustrated, either.

Figure 5:
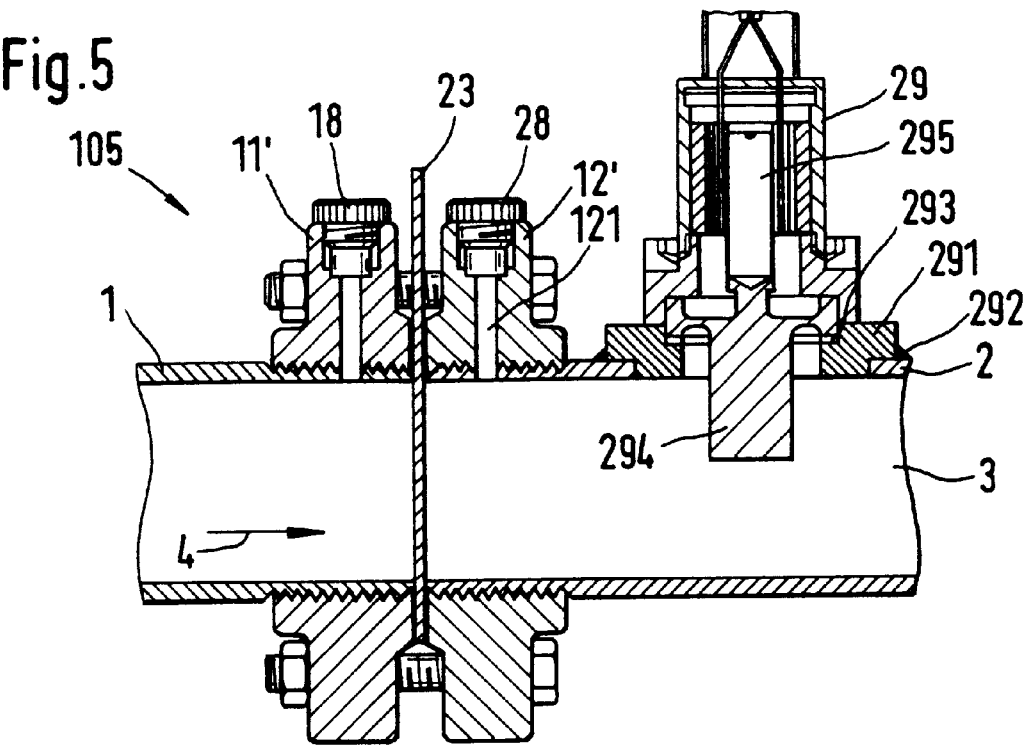
FIG. 5 shows a first embodiment of a volumetric flow sensor provided with the parts of a substitution kit according to the second variant of the invention.
Figure 6:
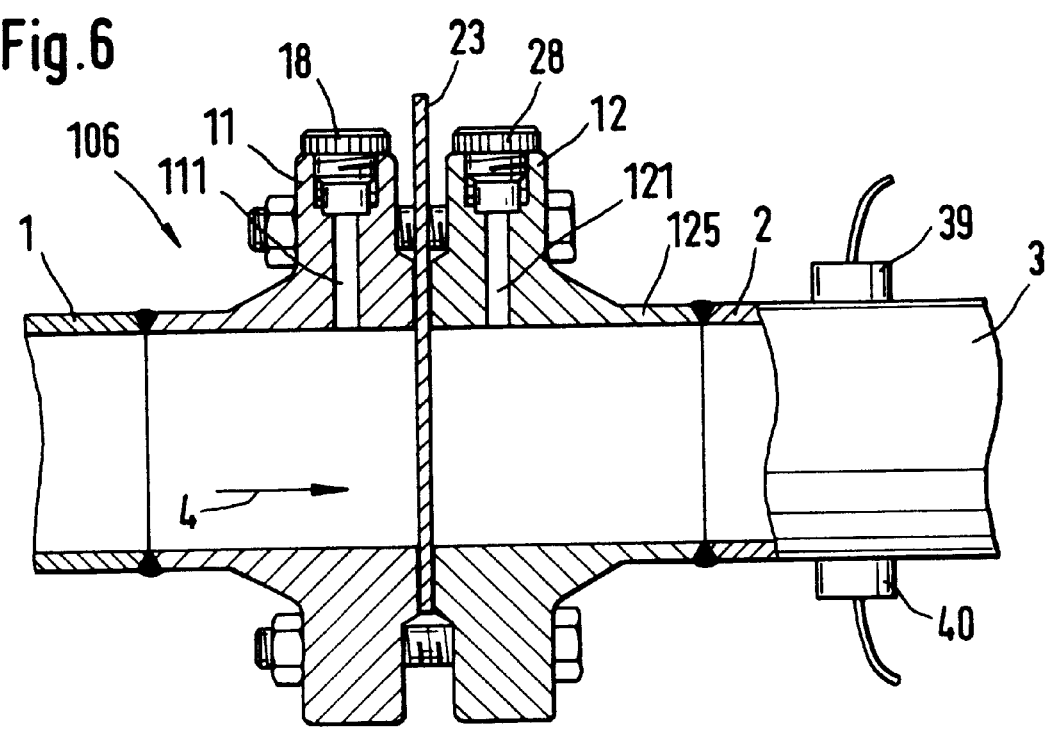
FIG. 6 shows a second embodiment of a volumetric flow sensor provided with the parts of a substitution kit according to the second variant of the invention.

FIGS. 1 to 4 show longitudinal sections of four embodiments of a volumetric flow sensor provided with the parts of a substitution kit according to the first variant of the invention. FIGS. 5 and 6 show longitudinal sections of two embodiments of a volumetric flow sensor provided with the parts of a substitution kit according to the second variant of the invention. Finally, FIGS. 7 and 8 show longitudinal sections of two embodiments of a volumetric flow sensor according to the third variant of the invention. FIGS. 1 to 8 thus show eight embodiments, in which radial bores corresponding to radial bores 112, 122 of FIG. 24 have been omitted.

While the orifice flow sensor of FIG. 24 is flow-direction-invariant, the direction of flow 4 in the eight embodiments of the invention is predetermined, as is indicated by the arrow. If the direction opposite to the direction of flow 4 is desired, the components 18 and 19, which are explained below, have to be interchanged.

In the first embodiment of the first variant, shown in FIG. 1, flow sensor 101 has been installed by screwing flanges 11' and 12' onto pipes 1 and 2, respectively, providing a fluid-tight seal between them.

According to a principal feature of the invention, orifice plate 13 of FIG. 24 is replaced by an annular disk 23 having the same thickness as orifice plate 13. The inside diameter of annular disk 23 is equal to the inside diameter of pipes 1, 2, so that flow channel 3 is not narrowed along its internal circumference by annular disk 23.

Figure 18:
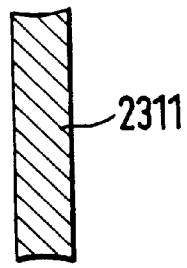
FIGS. 18 to 23 show preferred shapes of the horizontal sections of embodiments of the bluff body disposed in the opening of the annular disk.
Figure 19:
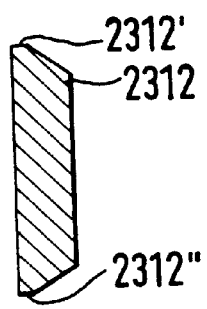

Disposed in the opening of annular disk 23 is a single bluff body 231 which is not thicker than annular disk 23 in the direction of flow. Some preferred and advantageous vertical-section shapes of bluff body 231 are shown in FIGS. 9 to 17, and advantageous cross-sectional shapes are shown in FIGS. 18 and 19. They are explained below.

In FIG. 1, according to a further principal feature of the invention, the pressure sensing element operatively connected with bore 111 in FIG. 24 has been removed, and it has been replaced by a device 18, e.g., a screw-in fitting, for closing bore 111 fluid-tight. The pressure sensing element operatively connected with bore 112 has also been removed, and it has been replaced by a vortex sensing element 19 installed fluid-tight in bore 112.

Figure 2:
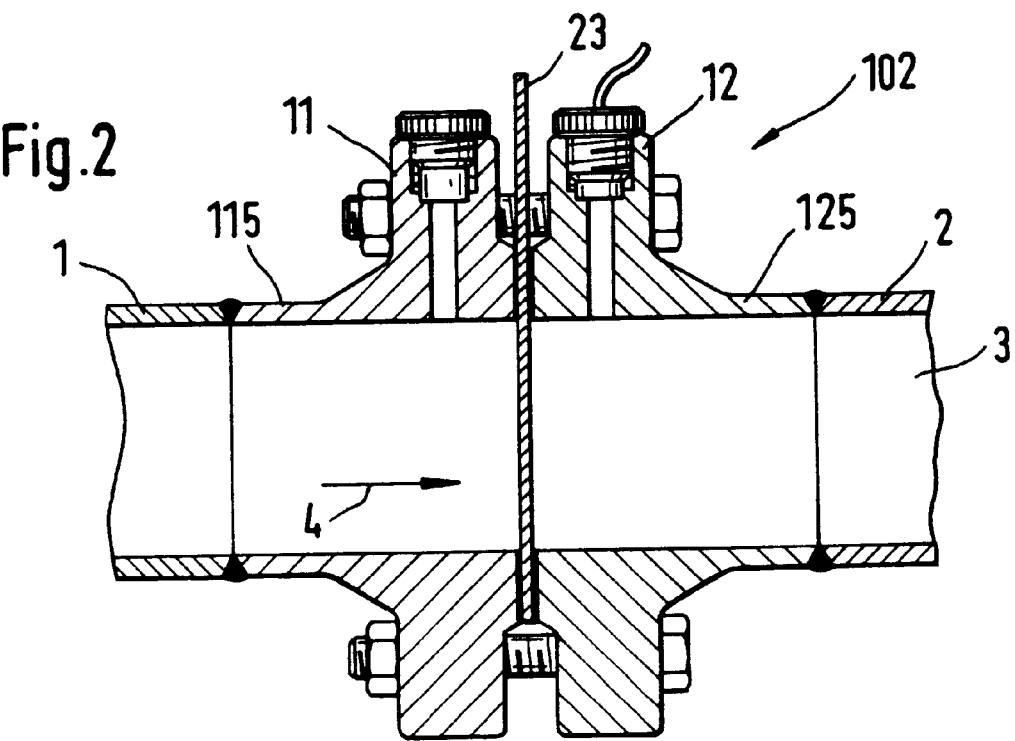
FIG. 2 shows a second embodiment of a volumetric flow sensor provided with the parts of a substitution kit according to the first variant of the invention.

In the second embodiment of the first variant, which is shown in FIG. 2, flow sensor 102 has been permanently installed in virtually the same manner as in FIG. 24, namely by butt-welding flange 11 to pipe 1 and flange 12 to pipe 2 via integral pipe sections 115 and 125, respectively. The further details of FIG. 2 correspond to those of FIG. 1.

Figure 3:
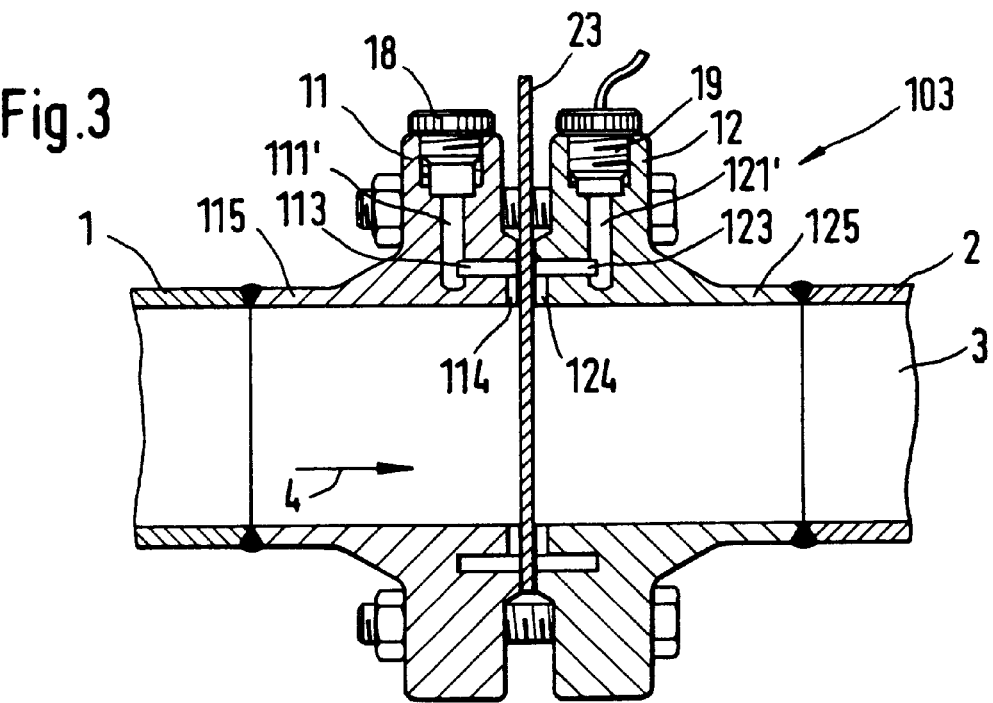
FIG. 3 shows a third embodiment of a volumetric flow sensor provided with the parts of a substitution kit according to the first variant of the invention.

In the third embodiment of the first variant, shown in FIG. 3, flow sensor 103 has been permanently installed between pipes 1, 2 in the same manner as in FIG. 1, namely by welding the pipes to flanges 11, 12.

To improve the sensing of the pressure fluctuations caused by the vortices shedding from the bluff body, flange 12 contains an annular groove 123 which, in this embodiment, ends in a blind hole 121' corresponding to bore 121 of FIG. 1. Furthermore, the surface of flange 12 facing annular disk 23 is provided with a recess 124 which begins at the lumen of the flange and ends in annular groove 123. Thus, pressure fluctuations which occur directly downstream of annular disk 23 can reach vortex sensing element 19.

Flange 11 of FIG. 3 is provided with a blind hole 111' formed in the same way as blind hole 121' in flange 12, with a corresponding annular groove 113, and with a corresponding recess 114. Their effects, however, are not utilized after installation of closing device 18. Further details of FIG. 3 correspond to those of FIG. 1.

Figure 4:
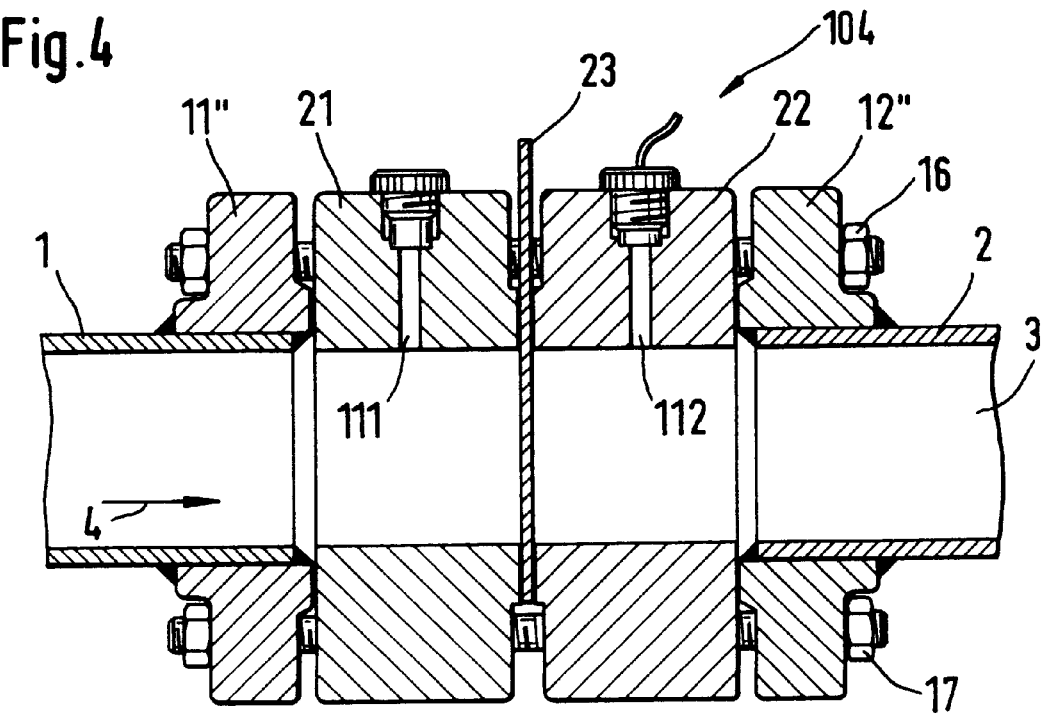
FIG. 4 shows a fourth embodiment of a volumetric flow sensor provided with the parts of a substitution kit according to the first variant of the invention.

In the fourth embodiment of the first variant, shown in FIG. 4, flow sensor 104 has been installed between pipes 1, 2 by inserting a first intermediate ring 21 and a second intermediate ring 22 between flanges 11" and 12" and bracing the parts by means of screws 16, 17. Bores 111 and 112 are located in intermediate rings 21 and 22, respectively, which consequently also contain closing device 18 and vortex sensing element 19, respectively.

In the embodiment of FIG. 4, flanges 11" and 12" are welded at their front and rear sides to pipes 1 and 2, respectively, such that a plane sealing surface is only formed at the front face of the respective flange. These sealing surfaces rest against intermediate rings 21 and 22, respectively.

In the first embodiment of the second variant of the invention, shown in FIG. 5, flow sensor 105 has been installed like in FIG. 1, namely by screwing flange 11' onto pipe 1 and flange 12' on to pipe 2 so as to provide respective fluid-tight seals. As in the embodiments described so far, annular disk 23 and closing device 18 are provided.

Unlike the four embodiments shown in FIGS. 1 to 4, in FIG. 5, bore 121 has been closed as well, namely by installing a fluid-tight closing device 28 therein after the pressure sensing element originally disposed in this bore has been removed.

In FIG. 5, a vortex sensor 29 has been mounted in pipe 2 close to annular disk 23. The construction of vortex sensor device 29 is basically the same as that of the vortex sensor described in the prior U.S. Provisional Application S/No. 60/030,465 filed on Oct. 17, 1997 and the corresponding U.S. Non-Provisional Application S/No. 08/953,229 filed on Nov. 11, 1996, the disclosure of these two U.S.-Applications is incorporated herein by reference to avoid repetition. Vortex sensor 29 has been installed fluid-tight in a bore of sufficient diameter formed in the wall of pipe 2. This is accomplished by means of a ring 291 which, on the one hand, fits the bore in the pipe wall and, on the other hand, rests on the outside of the pipe wall, where its edge is welded to the pipe wall at 292. On its side remote from the pipe, ring 291 is provided with a recess 293 which is welded to vortex sensor 29.

Vortex sensor 29 comprises a thin vane 294 which extends into the moving fluid and is moved back and forth in a direction perpendicular to the plane of the paper by the vortices caused by the bluff body in annular disk 23. The rear portion of vortex sensor 29 contains a sensing element 295, e.g., a capacitive sensing element, which converts the movements of vane 294 into an electric signal.

In the second embodiment of the second variant, shown in FIG. 6, flow sensor 106 has been permanently installed like in FIGS. 2 and 3, namely by butt-welding flange 11 to pipe 1 and flange 12 to pipe 2 via corresponding pipe sections formed integrally with the respective flanges. Like in FIG. 5, annular disk 23 and devices 18 and 19 for closing bores 111 and 121, respectively, are provided.

The vortex sensor is an ultrasonic transducer arrangement comprising a first ultrasonic transducer 39 and a second ultrasonic transducer 40. Ultrasonic transducer 39 is mounted close to annular disk 23 on the external surface of pipe 2. Diametrically opposite ultrasonic transducer 39, ultrasonic transducer 40 is mounted on the external surface of pipe 2. Especially suited for this purpose is a clamp-on ultrasonic transducer assembly.

One of the two ultrasonic transducers 39, 40 is excited into ultrasonic vibration by evaluation and operating electronics (not shown) and serves as an ultrasonic transmitter, while the other of the two ultrasonic transducers 39, 40 is operated as an ultrasonic receiver. The assignment as ultrasonic transmitter/receiver may be constant in time or alternate in time. In the latter case, the two ultrasonic transducers 39, 40 are thus operated alternately as transmitters and receivers.

The place where the ultrasonic transducer arrangement is mounted on flow channel 3 need not be on pipe 2 as shown in FIG. 6 for ease of illustration, but may also be on pipe section 125 as close to flange 12 as possible.

In the first embodiment of the third variant of the invention, shown in FIG. 7, flow sensor 107, which does not replace an orifice flow sensor, is installed on flow channel 3 by means of flanges 11*, 12*. Flanges 11* and 12* have been screwed onto pipes 1 and 2, respectively, like in FIGS. 1 and 5, but they have no bores corresponding to bores 111, 121. Annular disk 23 is fixed between flanges 11* and 12*, which have been screwed together. Vortex sensor 29 has been installed in the wall of pipe 2 like in FIG. 5.

In the embodiments of FIGS. 5 and 7, it is also possible to use a piezoelectric or inductive sensing element instead of a capacitive one.

In the second embodiment of the third variant of the invention, which is shown in FIG. 8, flow sensor 108, which does not replace an orifice flow sensor, is butt-welded to pipes 1 and 2 via flanges 11* and 12*, respectively, as was explained above with the aid of FIGS. 2, 3, and 6. Like in FIG. 7, flanges 11* and 12* have no bores corresponding to bores 111 and 121, respectively.

Like in FIG. 7, annular disk 23 is fixed between flanges 11*, 12*, which have been screwed together. The vortex sensor is an ultrasonic transducer arrangement corresponding to the arrangement of FIG. 6, i.e., an arrangement comprising ultrasonic transducers 39', 40'. These are arranged and can be operated as was explained with the aid of FIG. 6.

Instead of the ultrasonic transducer arrangement of FIG. 6 or 8, which comprises the two ultrasonic transducers 39, 40 or 39', 40', respectively, a combined ultrasonic transmitter/receiver arrangement may be used, which would have to be mounted at the location of ultrasonic transducer 39 or 39', respectively.

FIGS. 9 to 17 show vertical sections parallel to the planes of different shapes of annular disks as can be used in the invention. In each of FIGS. 9 to 17, the respective annular disk comprises a respective bluff body, a respective ring part, and an respective extension part. The latter serves to facilitate the handling and adjustment of the annular disk when position-ing the latter between flanges 11, 12, etc.

Figure 9:
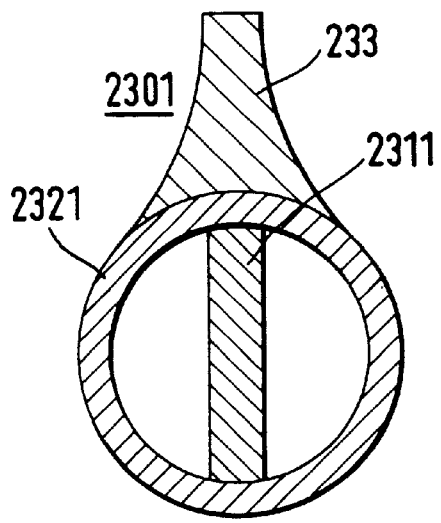
FIGS. 9 to 17 show vertical sections of nine embodiments of an annular disk as used in the invention, the sections being taken parallel to the planes of the respective disks.

A first embodiment of annular disk is shown in FIG. 9 and has the reference character 2301. A bluff body 2311 is column-shaped over its entire length, and it is disposed symmetrically along a disk diameter. At the joints with ring part 2321, bluff body 2311 is adapted to the curvature of ring part 2321 as well as possible.

Figure 10:
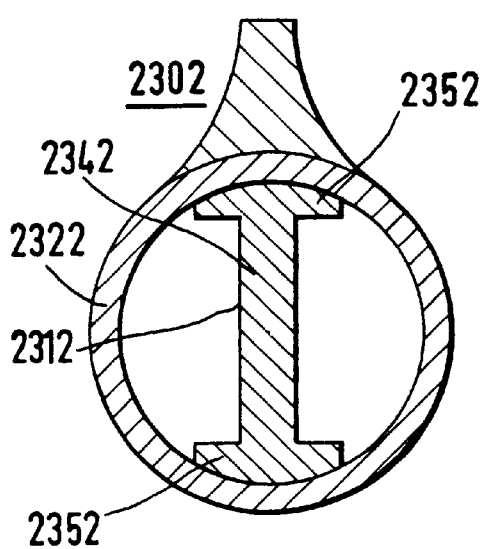

A second embodiment of annular disk is shown in FIG. 10 and has the reference character 2302. A bluff body 2312 comprises a column part 2342 which is disposed symmetrically along a disk diameter.

Shortly before the joints with ring part 2322, column part 2342 is provided with calotte-shaped portions 2352 which are approximately two to three times wider than, and make a right angle with, the column part. At the joints with ring part 2322, calotte-shaped portions 2352 are adapted to the curvature of ring part 2322 as well as possible.

Figure 11:
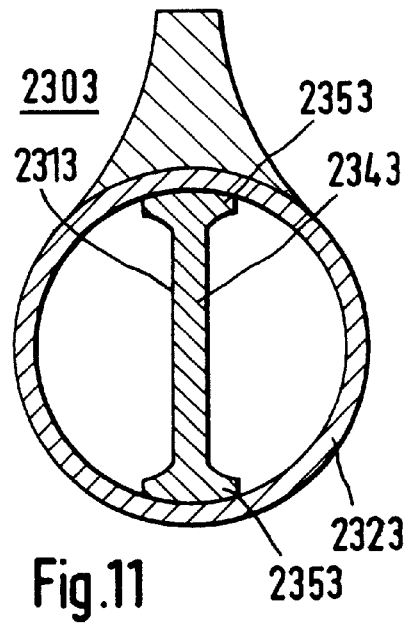

A third embodiment of annular disk is shown in FIG. 11 and has the reference character 2303. A bluff body 2313 comprises a column part 2343 which is disposed symmetrically along a disk diameter. Shortly before the joints with ring part 2323, column part 2343 is provided with calotte-shaped portions 2353 which are approximately two to three times wider than the column part.

At the junctions of column part 2343 and calotte-shaped portions 2353, the latter are rounded. At the joints with ring part 2323, calotte-shaped portions 2353 are adapted to the curvature of ring part 2323 as well as possible.

Figure 12:
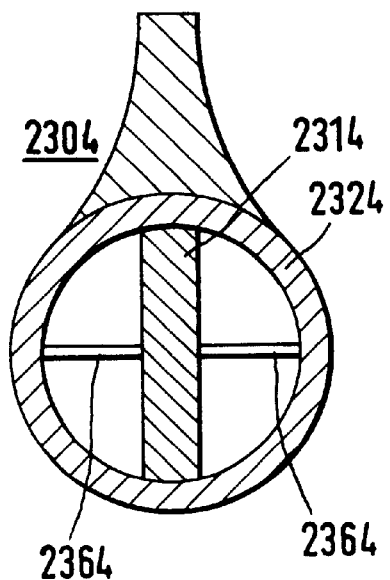

A fourth embodiment of annular disk is shown in FIG. 12 and has the reference character 2304. A bluff body 2314 is column-shaped over its entire length and disposed symmetrically along a disk diameter as in FIG. 9.

In addition to being attached to ring part 2324 by means of the aforementioned joints, bluff body 2314 is connected with ring part 2324 by two support elements 2364. Support elements 2364 are disposed symmetrically about a disk diameter which is perpendicular to the disk diameter belonging to bluff body 2314.

Figure 13:
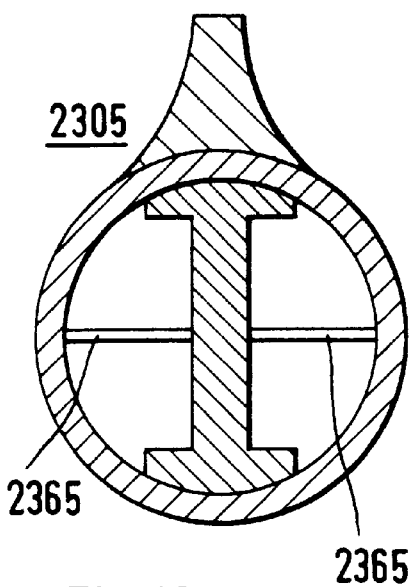
Figure 14:
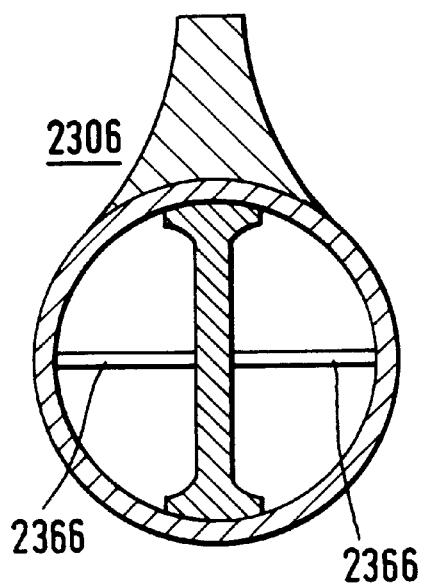

A fifth embodiment of annular disk is shown in FIG. 13 and has the reference character 2305. Support elements 2365 are also provided. A sixth embodiment of annular disk is shown in FIG. 14 and has the reference character 2306. Support elements 2365, 2366 are also provided. Otherwise FIGS. 13 and 14 are largely identical with FIGS. 10 and 11, respectively.

Figure 15:
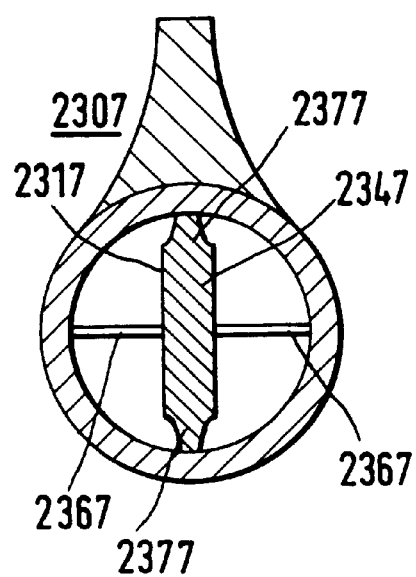

A seventh embodiment of annular disk is shown in FIG. 15 and has the reference character 2307. A bluff body 2317 comprises a column part 2347 with two thinner transition portions 2377, whereby respective steps are formed. Furthermore, support elements 2367 are again provided.

Figure 16:
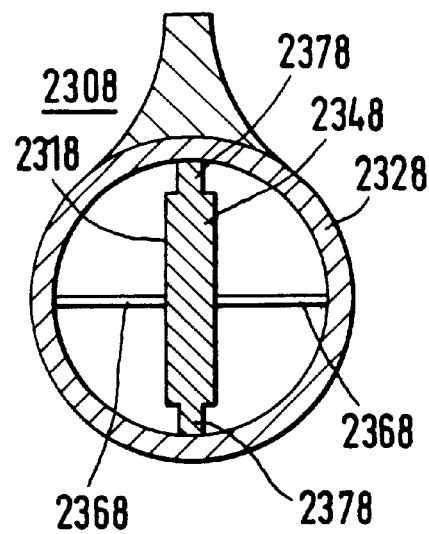

An eighth embodiment of annular disk is shown in FIG. 16 and has the reference character 2308. A bluff body 2318 comprises a column part 2348 with two transition portions 2378 which are thinner than column part 2348 and are rounded in the junction regions with the latter. Furthermore, support elements 2368 are again provided.

Figure 17:
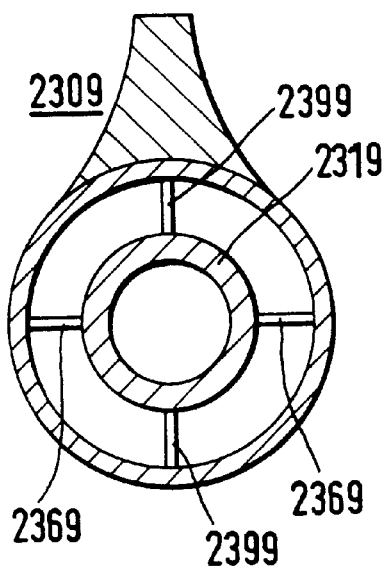

A ninth embodiment of annular disk is shown in FIG. 17 and has the reference character 2309. The bluff body 2319 is an annular body which is held in the lumen of annular disk 2309 by two support elements 2369 and two support elements 2399.

The two support elements 2369 and the two support elements 2399 are disposed symmetrically along mutually perpendicular disk diameters. The annular body 2319 therefore "floats" in the lumen of the annular disk.

FIGS. 18 to 23 show horizontal sections of preferred embodiments of the bluff body disposed in the lumen of annular disk 23. The bluff body has straight generating lines perpendicular to the plane of the paper. The upstream side in FIGS. 18 to 23 is on the left.

Bluff body 231₁ of FIG. 18 has a substantially rectangular section, but the narrow sides are slightly concave, e.g., with a radius of curvature greater than the thickness of bluff body 231₁, as shown.

The cross section of bluff body 231₂ of FIG. 19 has the form of a trapezoid, e.g., the form of an isosceles trapezoid, as shown. The sides of the trapezoid are flattened on the upstream side for generating separation edges 231₂', 231₂". The angle at which the narrow sides intersect with the upstream side is chosen in accordance with the thickness of bluff body 231₂ and is, for example 20°.

Figure 20:
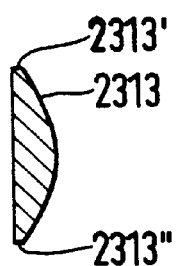

The cross section of bluff body 231₃ of FIG. 20 has the form of a lens which is flat on the upstream side and convex on the downstream side, and which has flat thin narrow sides serving as separation edges 2313', 2313".

Figure 21:
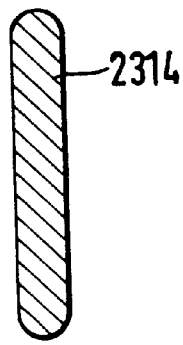

Bluff body 231₄ of FIG. 21 has a substantially rectangular cross section, but the narrow sides are convex in the form of a half circle with a radius equal to half the thickness of bluff body 231₄.

Figure 22:
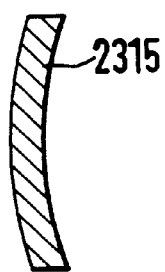

The cross section of bluff body 231₅ of FIG. 22 has the form of a lens which is convex on the upstream side and concave on the downstream side and whose narrow sides are flat and parallel to each other. The cross-sectional line on the upstream side and that on the downstream side are concentric circular arcs.

Figure 23:

The cross section of bluff body 231₆ of FIG. 23 has the form of a lens which is convex on the upstream side and concave on the downstream side. The cross-sectional line on the upstream side is a circular arc and that on the downstream side is also a circular arc which, however, has a greater radius than the arc on the upstream side. The two arcs intersect at the narrow sides of bluff body 231₆.

What is claimed is:

1. A substitution kit for replacing a field-installed volumetric flow sensor comprising an orifice plate of standard thickness fixed fluid-tight between a first pipe and a second pipe conducting a fluid to be measured in a direction of flow, a first pressure sensing element operatively connected with a first bore formed in the first pipe upstream of the orifice plate, and a second pressure sensing element operatively connected with a second bore formed in the second pipe downstream of the orifice plate, said substitution kit comprising:

an annular disk replacing the orifice plate, said annular disk having a thickness equal to the thickness of the orifice plate, and having an opening with a diameter substantially equal to an inside diameter of the first pipe and an inside diameter of the second pipe, said opening containing a single bluff body which is substantially equal to or less than the thickness of said annular disk in the direction of flow;

a device for closing the first bore fluid-tight after removal of the first pressure sensing element; and a vortex sensing element for fluid-tight installation in the second bore after removal of the second pressure sensing element.

2. A substitution kit for replacing a field-installed volumetric flow sensor comprising an orifice plate of standard thickness fixed fluid-tight between a first pipe and a second pipe conducting a fluid to be measured in a direction of flow, a first pressure sensing element operatively connected with a first bore formed in the first pipe upstream of the orifice plate, and a second pressure sensing element operatively connected with a second bore formed in the second pipe downstream of the orifice plate, said substitution kit comprising:

an annular disk replacing the orifice plate, said annular disk having a thickness substantially equal to the thickness of the orifice plate, and having an opening with a diameter substantially equal to an inside diameter of the first pipe and an inside diameter of the second pipe, said opening containing a single bluff body which is substantially equal to or less than the thickness of said annular disk in the direction of flow;

a device for closing the first bore fluid-tight after removal of the first pressure sensing element;

a device for closing the second bore fluid-tight after removal of the second pressure sensing element; and a vortex sensor mounted on or in the second pipe downstream of said annular disk.

3. A substitution kit as claimed in claim 2, wherein the vortex sensor is installed fluid-tight in the wall of the second pipe and comprises a capacitive sensing element.

4. A substitution kit as claimed in claim 2, wherein the vortex sensor comprises an ultrasonic measuring arrangement with two ultrasonic transducers mounted on a wall of the second pipe diametrically opposite each other.

* * * * *